(12) United States Patent
Burton (10) Patent No.: US 10,171,971 B2
(45) Date of Patent: Jan. 1, 2019

(54) ELECTRICAL SYSTEMS AND RELATED METHODS FOR PROVIDING SMART MOBILE ELECTRONIC DEVICE FEATURES TO A USER OF A WEARABLE DEVICE

(71) Applicant: Skullcandy, Inc., Park City, UT (US)

(72) Inventor: Thomas C. Burton, Park City, UT (US)

(73) Assignee: Skullcandy, Inc., Park City, UT (US)

( * ) Notice: Subject to any disclaimer, the term of this patent is extended or adjusted under 35 U.S.C. 154(b) by 0 days.

(21) Appl. No.: 15/377,826

(22) Filed: Dec. 13, 2016

(65) Prior Publication Data

US 2017/0180911 A1 Jun. 22, 2017

Related U.S. Application Data

(60) Provisional application No. 62/270,415, filed on Dec. 21, 2015.

(51) Int. Cl.
*H04W 4/70* (2018.01)
*H04W 4/80* (2018.01)
H04W 88/02 (2009.01)

(52) U.S. Cl.
CPC .............. *H04W 4/70* (2018.02); *H04W 4/80* (2018.02); *H04W 88/02* (2013.01)

(58) Field of Classification Search
CPC ...... H04M 19/08; H04M 10/44; H02J 7/0003; H02J 7/0045

(Continued)

(56) References Cited

U.S. PATENT DOCUMENTS 9,563,268 B2 2/2017 Smith et al.
2006/0059277 A1 3/2006 Zito et al.
(Continued)

FOREIGN PATENT DOCUMENTS

CN 1717956 A 1/2006
CN 102215740 A 10/2011
(Continued)

OTHER PUBLICATIONS

U.K. Further Search Report for U.K. Application No. 1621486.8 dated May 24, 2017, 3 pages.
(Continued)

*Primary Examiner* — Md Talukder
(74) *Attorney, Agent, or Firm* — TraskBritt (57) ABSTRACT

Electrical systems and related methods are disclosed. An electrical system includes a wearable mobile electronic device including cellular voice equipment configured to enable a user to participate in cellular voice calls, cellular data equipment configured to enable the wearable mobile electronic device to communicate through a cellular data network, one or more biometric sensors, and at least one audio speaker. A method includes selecting audio media based, at least in part on biometric information, and providing, with a remote server, data corresponding to the selected audio media to the wearable mobile electronic device through a cellular data network. An electrical system includes a wearable mobile electronic device including control circuitry configured to interact with a remote server to together provide smart mobile electronic device features to a user through the wearable mobile electronic device, wherein the control circuitry is alone insufficient to provide the smart mobile electronic device features.

9 Claims, 3 Drawing Sheets

(58) Field of Classification Search
USPC .................................................... 455/556.1
See application file for complete search history.

(56) References Cited

U.S. PATENT DOCUMENTS

| | | | |
|---|---|---|---|
| 2006/0107822 A1 | 5/2006 | Bowen | |
| 2007/0113725 A1 | 5/2007 | Oliver et al. | |
| 2007/0113726 A1 | 5/2007 | Oliver et al. | |
| 2008/0076972 A1 | 3/2008 | Dorogusker et al. | |
| 2008/0263579 A1 | 10/2008 | Mears et al. | |
| 2011/0040395 A1 | 2/2011 | Kraemer et al. | |
| 2014/0106677 A1* | 4/2014 | Altman | H04W 4/80 455/41.2 |
| 2014/0119554 A1 | 5/2014 | Chan et al. | |
| 2014/0277648 A1* | 9/2014 | Chong | G06N 99/005 700/94 |
| 2015/0081066 A1* | 3/2015 | Yeh | A61B 5/7415 700/94 |
| 2015/0100144 A1 | 4/2015 | Lee et al. | |
| 2015/0110282 A1 | 4/2015 | Sun | |
| 2015/0223731 A1* | 8/2015 | Sahin | A61B 5/16 600/301 |
| 2015/0258301 A1* | 9/2015 | Trivedi | A61M 21/02 600/28 |
| 2015/0279418 A1 | 10/2015 | Laksono et al. | |
| 2015/0358438 A1* | 12/2015 | Kim | H04W 4/70 455/566 |
| 2016/0089028 A1 | 3/2016 | Chatterjee et al. | |
| 2016/0094700 A1* | 3/2016 | Lee | H04W 8/245 455/419 |
| 2016/0134997 A1 | 5/2016 | Guo | |
| 2016/0357501 A1 | 12/2016 | Burton | |
| 2017/0149945 A1 | 5/2017 | Lee et al. | |
| 2017/0150255 A1 | 5/2017 | Wang et al. | |
| 2017/0214786 A1* | 7/2017 | Lee | H04M 1/72569 |
| 2017/0308182 A1* | 10/2017 | Belverato | G06F 3/0346 |

FOREIGN PATENT DOCUMENTS

| | | |
|---|---|---|
| CN | 102930888 A | 2/2013 |
| CN | 104363557 A | 2/2015 |
| CN | 104954949 A | 9/2015 |
| CN | 106571844 A | 4/2017 |
| EP | 2431900 | 3/2012 |
| KR | 1020160113072 A | 9/2016 |
| WO | 2013188769 A1 | 12/2013 |
| WO | 2014144918 | 9/2014 |
| WO | 2015157677 A1 | 10/2015 |

OTHER PUBLICATIONS

Concept Phones, Wearable Phone, http://www.concept-phones.com/?s=wearable+phone. visited Aug. 19, 2015, 19 pages.
Seth, Radhika, Phone, Ear-Phone, Phone, www.yankodesign.com/2009/06/08/phone-ear-phone-phone/, Jun. 8, 20019, 13 pages.
U.K. Examination and Search Report for U.K. Application No. 1621486.8 dated May 24, 2017, 7 pages.
U.K. Further Search Report for U.K. Application No. 1621486.8 dated Feb. 1, 2108, 5 pages.
U.K. Further Search Report for U.K. Application No. 1621486.8 dated Sep. 24, 2018, 3 pages.
Chinese Office Action for Chinese Application No. 201611188251.2, dated Sep. 25, 2018, 28 pages.

* cited by examiner

ELECTRICAL SYSTEMS AND RELATED METHODS FOR PROVIDING SMART MOBILE ELECTRONIC DEVICE FEATURES TO A USER OF A WEARABLE DEVICE

CROSS-REFERENCE TO RELATED APPLICATION

This application claims the benefit under 35 U.S.C. § 119(e) of U.S. Provisional Patent Application Ser. No. 62/270,415, filed Dec. 21, 2015, the entire contents and disclosure of which is hereby incorporated herein in its entirety by this reference.

TECHNICAL FIELD

Embodiments of the disclosure relate to electrical systems and related methods for providing smart mobile electronic device features to a user of a wearable mobile electronic device that is alone not capable of providing the smart mobile electronic device features.

BACKGROUND

Some conventional mobile electronic devices include handsets (e.g., smartphones, tablets, etc.) including a screen (e.g., a liquid crystal display), relatively powerful processing circuitry (e.g., executing mobile operating systems and software applications ("apps") stored in digital storage), and user input/output interfaces (e.g., a touch screen interface). Many people use digital media players executed by the processing circuitry of these handsets, along with peripheral electronics (e.g., headphones, speakers, etc.) to listen to audio digital media (e.g., music, podcasts, etc.).

Current trends for these types of mobile electronic devices are for larger and larger screens, and for faster and more powerful processing. As a result, the physical size of handsets has trended toward larger overall size (e.g., to accommodate for the larger screens, and associated battery for powering the larger screens and more powerful processing). The increase in size of mobile electronic devices may be inconvenient for some users. For example, for users that desire to use the mobile electronic devices to play audio digital media during physical activity (e.g. exercise), it may be difficult to fit large mobile electronic devices in a pocket, or to strap mobile electronic devices to their bodies. If the trend for larger mobile electronic devices continues, this problem may become more severe. Other problems and disadvantages may exist in the prior art.

Accordingly, there is a need for systems and methods that do not have the limitations and disadvantages described above.

BRIEF SUMMARY

Various embodiments of the present disclosure comprise mobile electronic circuits, including wearable electronic circuits, which facilitate delivery of features remotely to a user, and methods of delivery using the same.

One or more embodiments of the disclosure include an electrical system. In the one or more embodiments the electrical system includes a wearable mobile electronic device. The wearable mobile electronic device may include cellular voice equipment, cellular data equipment, one or more biometric sensors, at least one audio speaker, and control circuitry. The cellular voice equipment may be configured to enable a user of the wearable mobile electronic device to participate in cellular voice calls through a cellular voice network. The cellular data equipment may be configured to enable the wearable mobile electronic device to communicate through a cellular data network. The control circuitry may be operably coupled to the cellular voice equipment, the cellular data equipment, the one or more biometric sensors, and the at least one audio speaker, the control circuitry including a processor operably coupled to a data storage device comprising computer-readable instructions stored thereon, the processor configured to execute the computer-readable instructions. The computer-readable instructions may be configured to instruct the processing element to engage in communications with a remote server using the cellular data equipment; and interact with the remote server to provide audio signals to the at least one audio speaker, the audio signals corresponding to audio media selected based, at least in part, on biometric data provided to the control circuitry by the one or more biometric sensors.

Other embodiments of the disclosure include a method of operation of an electrical system. Embodiments of the method include detecting biometric information of a user of a wearable mobile electronic device with one or more biometric sensors of the wearable mobile electronic device; selecting audio media based, at least in part, on the biometric information; providing, with a remote server, data corresponding to the selected audio media to the wearable mobile electronic device through a cellular data network; and placing and receiving cellular voice calls natively with the wearable mobile electronic device through a cellular voice network.

Other embodiments of the disclosure include an electrical system. In various embodiments of the electrical system, the electrical system may include a wearable mobile electronic device. The wearable mobile electronic device may include cellular voice equipment, cellular data equipment, and control circuitry. The cellular voice equipment may be configured to enable a user of the wearable mobile electronic device to participate in cellular voice calls through a cellular voice network. The cellular data equipment may be configured to enable the wearable mobile electronic device to communicate through a cellular data network with a remote server. The control circuitry may be operably coupled to the cellular voice equipment and the cellular data equipment, the control circuitry including a processor operably coupled to a data storage device comprising computer-readable instructions stored thereon, the processor configured to execute the computer-readable instructions, the computer-readable instructions configured to instruct the processor to interact with the remote server to together provide smart mobile electronic device features to the user through the wearable mobile electronic device, wherein the control circuitry is alone insufficient to provide the smart mobile electronic device features.

The foregoing and other features and advantages of the embodiments of the disclosure will be made more apparent from the following description, drawings and appended claims.

DETAILED DESCRIPTION

In the following detailed description, reference is made to the accompanying drawings which form a part hereof, and in which is shown by way of illustration, specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions rearrangements, or combinations thereof within the scope of the disclosure may be made and will become apparent to those of ordinary skill in the art.

In addition, some of the drawings may be simplified for clarity. Thus, the drawings may not depict all of the components of a given apparatus (e.g., device) or method. In addition, like reference numerals may be used to denote like features throughout the specification and figures.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the disclosure may be implemented on any number of data signals including a single data signal.

Embodiments of the disclosure include electrical systems and related methods for providing smart mobile electronic device features to a user of a wearable mobile electronic device that is not alone capable of providing the smart mobile electronic device features. It should be noted that while the utility and application of the various embodiments of the disclosure are described with reference to headphone devices, the disclosure also finds application to any wearable mobile electronic devices.

As used herein, the term "audio media" may refer to any media content that includes an audible component that may be played on an audio device. For example, both purely audible content (e.g., music, radio, audio podcasts) and mixed media content (e.g., audio-video) include audible components.

As used herein, the terms "operably couple," "operably coupled," "operably coupling," and other forms of the term "operably couple" refer to both wireless (e.g., BLUETOOTH®, WiFi, ZIGBEE®, etc.) and wired (e.g., electrical, optical, etc.) connections. "Operably couple," and its other forms may also refer to both direct (i.e., nothing coupled in between operably coupled components) and indirect (i.e., other components coupled in between operably coupled components) connections.

As used herein, the term "personal area network" (PAN) refers to communication networks that are restricted to use by a certain private user or group of private users (e.g., a user or users that share a same domicile), and may not be readily accessed through wide area networks (WANs) (e.g., the Internet). By way of non-limiting example, PANs may include wireless (e.g., BLUETOOTH®, WiFi, ZIGBEE®, etc.) and wired (e.g., electrical, optical, etc.) networks.

As used herein, the term "biometric" refers to measurements of human body characteristics (e.g., acceleration, heart rate, temperature, location, heart rate variability, pulse oxygenation, etc.).

Figure 1:
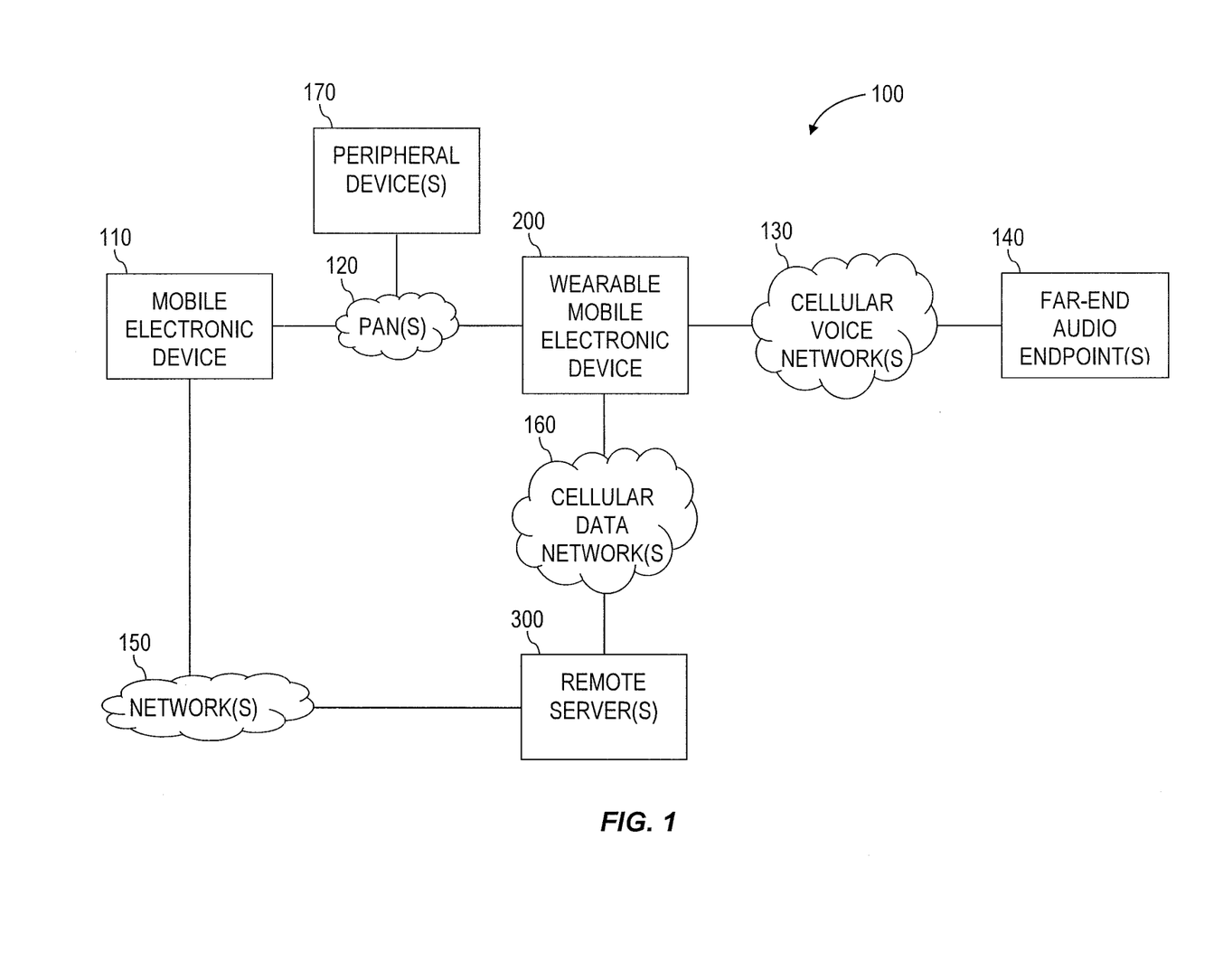
FIG. 1 is a simplified block diagram of an electrical system including a wearable mobile electronic device.

FIG. 1 is a simplified block diagram of an electrical system 100 including a wearable mobile electronic device 200. The wearable mobile electronic device 200 may include a headphone device (e.g., a single-ear mono headphone, a two-ear stereo headphone, etc.), a watch, a lanyard, a bracelet, a headband, a pair of glasses, or other wearable device. The wearable mobile electronic device 200 may be configured to serve, either on a temporary or a permanent basis, as a primary input/output device to a user of the electrical system 100 without requiring a large screen or relatively powerful processing circuitry in the wearable mobile electronic device 200. Accordingly, the wearable mobile electronic device 200 may be configured to provide smart mobile electronic device features without bulk typically associated with conventional smart mobile electronic devices. As a result, the wearable mobile electronic device 200 may be ideal for use when the user is on-the-go, or participating in physical activities (e.g., exercise, sports, etc.).

To the extent that relatively powerful processing circuitry may be required to perform some functions typically associated with smart mobile electronic devices, the wearable mobile electronic device 200 may be configured to perform these functions with the assistance of one or more remote servers 300 configured to provide cloud processing. For example, the wearable mobile electronic device 200 may be configured to communicate with the remote servers 300 through cellular data networks 160. The wearable mobile electronic device 200 may also, however, be capable of communicating with the remote servers 300 through other wireless networks, such as, for example, WiFi, if such other wireless networks are available. The wearable mobile electronic device 200 may also be configured to natively place and receive cellular voice calls to far-end audio endpoints 140 (e.g., conventional telephones, cellular telephones, VOIP phones, etc.) through cellular voice networks 130.

In some embodiments, the wearable mobile electronic device 200 may be configured to interact with the remote servers 300 to provide smart audio services to the user. By way of non-limiting example, the wearable mobile electronic device 200 may include biometric sensors configured to monitor physical conditions of the user (e.g., position, heart rate, acceleration, etc.). The wearable mobile electronic device 200 may also be configured to interact with the remote servers 300 to provide audio media content to the user. As a specific, non-limiting example, the remote servers 300 may be configured to receive biometric data originating at the biometric sensors of the wearable mobile electronic device 200, select audio media content based, at least in part on the biometric data, and stream the selected audio media content to the wearable mobile electronic device 200.

In some embodiments, the remote servers 300 may be configured to execute a full mobile operating system, and the wearable mobile electronic device 200 may serve primarily as an interface between the user and the full mobile operating system executed by the remote servers 300. The wearable mobile electronic device 200 may also be configured to execute a less powerful version of a mobile operating system, which may enable the wearable mobile electronic device 200 to provide some smart mobile electronic features, even when the remote servers 300 are not available to provide the smart mobile electronic features of the full mobile operating system. By way of non-limiting example, the less powerful version of the mobile operating system may include audio media player apps configured to play audio media that has been stored on the wearable mobile electronic device 200 (e.g., in data storage devices 214 of FIG. 2).

In some embodiments, the electrical system 100 may include one or more peripheral devices 170 configured to communicate with the wearable mobile electronic device 200 through one or more personal area networks (PANs) 120. By way of non-limiting example, the peripheral devices 170 may include a handset-type peripheral device including a touch screen. The wearable mobile electronic device 200 may be configured to operate while paired with the handset-type peripheral device, and while communicating with the remote servers 300, which may provide extra processing power (e.g., the full mobile operating system). In this way, the user may be provided a similar user experience while interacting with the handset-type peripheral device as would be experienced while interacting with a conventional handset-type mobile electronic device. In such embodiments, the user could choose to forego use of the handset-type peripheral device while on-the-go, or while doing physical activities, and not be inconvenienced by the bulk of the handset-type peripheral device. The user would still have access to smart mobile electronic device functions (e.g., smart audio services), and ingoing and outgoing calls through the wearable mobile electronic device 200.

In some embodiments, the peripheral devices 170 may include other peripheral devices. By way of non-limiting example, the other peripheral devices 170 may include wireless keyboards, wireless sporting equipment, electronic displays, wireless audio speakers, cameras, other devices, and combinations thereof. Also by way of non-limiting example, the other peripheral devices may include a smart television configured to display and enhance the smart mobile electronic features provided by the wearable mobile electronic device 200.

In some embodiments, the remote servers 300 may include an audio interface. The audio interface may be configured to enable the user to provide vocal inputs (e.g., speech) through the wearable mobile electronic device 200, and to provide audible outputs to the user through the wearable mobile electronic device 200. Accordingly, at least one of the wearable mobile electronic device 200 and the remote servers 300 may be configured to execute speech recognition software and speech generation software. Also, the remote servers 300 may be configured to process the speech (e.g., text generated from the input speech) to determine what the user is attempting to communicate with the input speech (e.g., identify what commands the user is issuing using speech).

In some embodiments, the electrical system 100 may include a mobile electronic device 110. The mobile electronic device 110 may include a handset-type mobile electronic device including a relatively large screen display and relatively powerful processing circuitry (e.g., a smart phone, a tablet, etc.). The wearable mobile electronic device 200 may be configured to communicate with the mobile electronic device 110 through the PANs 120. By way of non-limiting example, the mobile electronic device 110 may be modified with a software application executed in a mobile operating system environment (e.g., a full mobile operating system environment) of the mobile electronic device 110. The software application may be configured to instruct the mobile electronic device 110 to assist the wearable mobile electronic device 200 in processing. For example, the mobile electronic device 110 may be configured to assist the wearable mobile electronic device 200 in providing smart mobile electronic device functions (e.g., smart audio services). Accordingly, the wearable mobile electronic device 200 may be configured to receive processing assistance from the mobile electronic device 110, the remote servers 300, or a combination thereof.

In some embodiments, the wearable mobile electronic device 200 may be configured to select one of the mobile electronic device 110 and the remote servers 300 to provide processing assistance based on dynamic functional parameters. By way of non-limiting example, the wearable mobile electronic device 200 may be configured to take into consideration communication speeds, the amount of battery power required to support the communications, and overall processing capabilities associated with receiving assistance from the mobile electronic device 110 and the remote servers 300. As a specific, non-limiting example, if the wearable mobile electronic device 200 determines that there is a poor data connection through the cellular data networks 160 to the remote servers 300, and a good data connection is available to the mobile electronic device 110 through the PANs 120, the wearable mobile electronic device 200 may select the mobile electronic device 110 to provide processing assistance. As another specific, non-limiting example, if the wearable mobile electronic device 200 determines that it would require less battery power to interact with the mobile electronic device 110 than with the remote servers 300, the wearable mobile electronic device 200 may select the mobile electronic device 110 to provide processing assistance.

In some embodiments, the mobile electronic device 110 and the remote servers 300 may be configured to communicate with each other through one or more networks 150 (e.g., the Internet). The software application of the mobile electronic device 110 may be configured to enable the user to select smart mobile electronic features of the mobile electronic device 110 that the user would like to have available through cloud processing of the remote servers 300, and transmit data corresponding to the selected smart mobile electronic features to the remote servers 300. By way of non-limiting example, a user may desire to go for a run with the wearable mobile electronic device 200 without taking the mobile electronic device 110 on the run. The user may desire to receive social networking updates, and listen to audio media while on the run. Accordingly, the user may select the desired social networking features and media player features that the user desires to use during the run, and the mobile electronic device 110 may transmit relevant information to the remote servers 300 to provide the selected features.

In some embodiments, the remote servers 300 may store at least a portion of the data stored on the mobile electronic device 110, and interact with the wearable mobile electronic device 200 to provide the smart mobile electronic features that the mobile electronic device 110 is configured to provide. By way of non-limiting example, the remote servers 300 may store a disc image of substantially all the data (e.g., at least about 90% of the data) stored on the mobile electronic device 110, and operate as a virtual version of the mobile electronic device 110. In this example, the remote servers 300 and the mobile electronic device 110 may be configured to synchronize to update each other when changes are made to the data stored by either of the mobile electronic device 110 and the remote servers 300. Also by way of non-limiting example, the remote servers 300 may store portions of the data stored on the mobile electronic device 110. For example, the remote servers 300 may store data corresponding to media content, images, contacts lists, social networking data, internet browser histories, software code, and other data.

In some embodiments, the wearable mobile electronic device 200 may be configured to interact remotely with the mobile electronic device 110 through the remote servers 300. In such embodiments, the remote servers 300 may serve primarily as an interface between the wearable mobile electronic device 200 and the mobile electronic device 110. In other words, the mobile electronic device 110 may be configured to perform processing to provide smart mobile electronic device features to the wearable mobile electronic device 200 when the wearable mobile electronic device 200 is remote from the mobile electronic device 110, and the remote servers 300 may relay communications between the mobile electronic device 110 and the wearable mobile electronic device 200.

In some embodiments, the mobile electronic device 110, the wearable mobile electronic device 200, and one or more other, operatively connected electronic devices (e.g., devices executing voice calls over networks, such as, for example, by voice-over-Internet protocols (VOIP)) may share a same telephone number for placing and receiving cellular voice calls. In some embodiments, the mobile electronic device 110, the wearable mobile electronic device 200, and one or more other, operatively connected electronic devices may have different telephone numbers associated therewith. In some embodiments, the mobile electronic device 110 may not have native cellular voice or other independent, network-connected, voice calling communication capabilities.

The wearable mobile electronic device 200 may be configured to perform functions without the assistance of the remote servers 300 or the mobile electronic device 110. In order to make the wearable mobile electronic device 200 small and light enough to enable convenient use when the user is on-the-go or participating in physical activity, however, there may be some smart mobile electronic features that the wearable mobile electronic device 200 does not provide when operating in isolation. At a minimum, however, the wearable mobile electronic device 200 may be configured to, in isolation from the mobile electronic device 110 and the remote servers 300, place and receive voice calls (e.g., via cellular or Internet network connections), communicate using cellular data networks, and play audio media.

Figure 2:
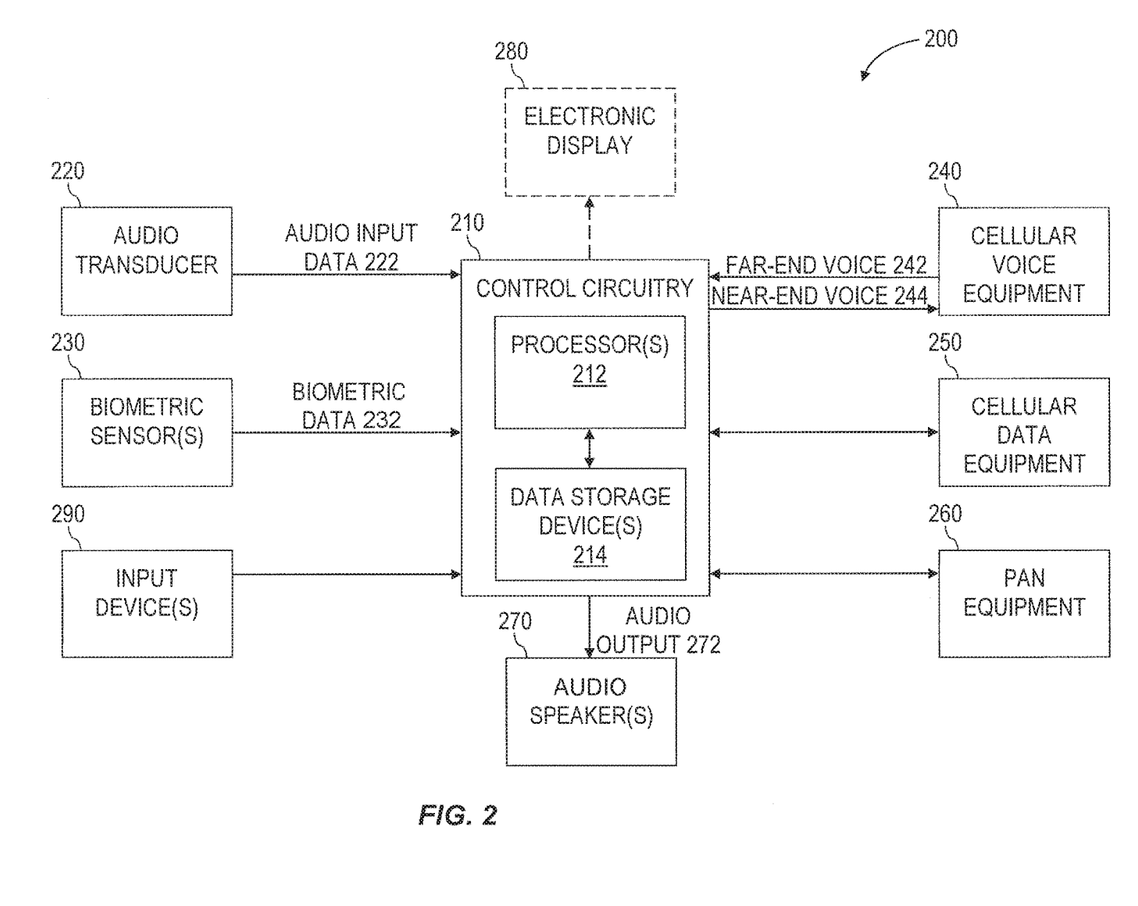
FIG. 2 is a simplified block diagram of the wearable mobile electronic device of FIG. 1.

FIG. 2 is a simplified block diagram of the wearable mobile electronic device 200. As previously discussed, the wearable mobile electronic device 200 may be configured to communicate through the cellular voice networks 130 (FIG. 1), the cellular data networks 160 (FIG. 1), and the PANs 120 (FIG. 1). Accordingly, the wearable mobile electronic device 200 may include control circuitry 210 operably coupled to communication equipment including cellular voice equipment 240, cellular data equipment 250, and PAN equipment 260. The cellular voice equipment 240, the cellular data equipment 250, and the PAN equipment 260 may be configured to enable the control circuitry 210 to communicate through the cellular voice networks 130, the cellular data networks 160, and the PANs 120 (FIG. 1), respectively, as is known in the art.

The wearable mobile electronic device 200 may also include at least one audio speaker 270 operably coupled to the control circuitry 210 and configured to provide audio media content to a user of the wearable mobile electronic device 200. In some embodiments, the audio speaker 270 may include a speaker element of a headphone. The audio speaker 270 may also be configured to provide audible outputs for an audible user interface provided by the wearable mobile electronic device 200 (e.g., while used in isolation from, or in conjunction with, the remote servers 300, the mobile electronic device 110 (FIG. 1), or a combination thereof). The audio speaker 270 may also be configured to provide far-end voice 242 received from the far-end audio endpoints 140 (FIG. 1) through the cellular voice equipment 240 during voice call sessions to the user. Accordingly, the control circuitry 210 may be configured to deliver an audio output 272 including the audio media content, the audible outputs, and the far-end voice 242 to the audio speakers 270. The audio speakers 270 may be configured to convert the audio output 272 into acoustic waves that may be heard by the user of the wearable mobile electronic device 200.

The wearable mobile electronic device 200 may further include one or more audio transducers 220 (e.g., a microphone) configured to convert acoustic energy to audio input data 222. The audio transducer 220 may be configured to deliver the audio input data 222 to the control circuitry 210. The audio input data 222 may include near-end voice 244, which the control circuitry 210 may relay to the far-end audio endpoints 140 (FIG. 1) through the cellular voice equipment 240. The audio input data 222 may also include audio inputs for the audible user interface. Accordingly, in some embodiments, the control circuitry 210 may process the audio input data 222 with speech recognition software, or route the audio input data 222 to at least one of the remote servers 300 (e.g., through the cellular data equipment 250) and the mobile electronic device 110 (FIG. 1) (e.g., through the PAN equipment 260 for processing).

With the wearable mobile electronic device 200 equipped to receive audio inputs and provide audible outputs to the user, the wearable mobile electronic device 200 may be capable of providing smart mobile electronic device features to the user while interfacing with the user through audible inputs and outputs. As a result, the wearable mobile electronic device 200 may enable the user to enjoy the smart mobile electronic device features without the need to carry a cumbersome handset, and without the need of an electronic display. Accordingly, in some embodiments, the wearable mobile electronic device 200 may not include an electronic display.

The wearable mobile electronic device 200 may also include one or more biometric sensors 230 operably coupled to the control circuitry 210. By way of non-limiting example, the biometric sensors 230 may include an accelerometer, a temperature sensor, a location sensor (e.g., a Global Positioning System (GPS)), a heart-rate variability sensor, a pulse oxygenation sensor, other sensors, and combinations thereof. The biometric sensors 230 may be configured to provide biometric data 232 indicating measurements taken by the biometric sensors 230 to the control circuitry 210. In some embodiments, the control circuitry 210 may be configured to process the biometric data 232. In some embodiments, the control circuitry 210 may route the biometric data 232 to one or both of the remote servers 300 (FIG. 1) and the mobile electronic device 110 (FIG. 1) for processing.

The control circuitry 210 may include one or more processors 212 (hereinafter "processors" 212) operably coupled to one or more data storage devices 214 (hereinafter "storage devices" 214). The storage devices 214 may be configured to store computer-readable instructions configured to instruct the processors 212 to perform at least a portion of the functions the control circuitry 210 is configured to perform. In some embodiments, the computer-readable instructions may be configured to instruct the processors 212 to execute a partial version of a full mobile operating system. This partial version of the full mobile operating system may be configured to operate in conjunction with the full mobile operating system, which may be executed by at least one of the remote servers 300 (FIG. 1) and the mobile electronic device 110 (FIG. 1). Also by way of non-limiting example, the computer-readable instructions may be configured to instruct the processors 212 to execute mobile software applications configured to operate in a software environment provided by the partial version of the full mobile operating system.

By way of non-limiting example, the computer-readable instructions may be configured to instruct the processors 212 to provide a software media player. The software media player may be configured to play media (e.g., audio media) stored on the data storage devices 214, the remote servers 300 (FIG. 1), the mobile electronic device 110 (FIG. 1), and combinations thereof. In some embodiments, the software media player may be configured to automatically select media to play for the user based, at least in part, on the biometric data 232. As a specific, non-limiting example, the software media player may be configured to dynamically determine a desired heart rate during a workout, and use the biometric data 232 to select media that may help the user to achieve the desired heart rate during the workout. For example, a runner may subconsciously or consciously adjust a rate of running steps to match a beat of music that the runner is listening to. The software media player may monitor the user's heart rate using biometric data 232 from a heart rate monitor of the biometric sensors 230 while the user is running. The software media player may also monitor the rate of running steps that the user takes using biometric data 232 from an accelerometer of the biometric sensors 230. If the desired heart rate is greater than the measured heart rate of the user, the software media player may select media with a beat that is faster than the user's measured rate of running steps. If, however, the desired heart rate is less than the measured heart rate of the user, the software media player may select media with a beat that is slower than the user's measured rate of running steps. The frequency of the beats of the media may be determined by reading metadata indicating the frequency of the beats, which may be embedded into the media files. Also, the frequency of the beats of the media may be determined by performing frequency analysis on the media files (e.g., a fast Fourier transform). In some embodiments, the software media player may be configured to determine the desired heart rate based, at least in part, on a long-term training program. For example, the user may desire to train for a competition on a given date (e.g., a triathlon, a marathon, other competitions, etc.). The software media player may provide media to the user to help the user to follow the long-term training program. In some embodiments, the user may override the automatic selection of media, if desired, and manually select media to consume.

Also by way of non-limiting example, the computer-readable instructions may be configured to instruct the processors 212 to provide social media (e.g., FACEBOOK®, INSTAGRAM®, PINTEREST®, TWITTER®, etc.) access to the user. In some embodiments, information (e.g., updates, alerts, etc.) from social media may be presented to the user in audio form through the audio speakers 270. Also, the user may post information to his or her social media accounts (e.g., verbally through the audio transducer 220). In some embodiments, the control circuitry 210 may monitor the user's progress in physical training, and automatically generate social media posts when the user reaches certain training milestones.

As a further non-limiting example, the computer-readable instructions may be configured to instruct the processors 212 to provide web searching capabilities to the user. In some embodiments, the audio transducer 220 and the audio speakers 270 may be configured to provide an audio interface for web searching. For example, the user may speak commands that may be converted to audio input data 222 by the audio transducer 220, and the control circuitry 210 may provide audio output 272 to the audio speakers 270 indicating results of the web searches.

Other non-limiting examples of functionality that may be provided through the computer-readable instructions include text messaging, placing and receiving of telephone calls, GPS location and directions services, other functions, and combinations thereof.

The computer-readable instructions may be configured for execution by a relatively weak processor of the wearable mobile electronic device 200, as compared to processors of the mobile electronic device 110 (FIG. 1) and the remote servers 300 (FIG. 1). Accordingly, processing for the functions discussed herein may be diverted by the control circuitry 210 to the mobile electronic device 110, the remote servers 300, or combinations thereof. When the wearable mobile electronic device 200 is operating in isolation from the mobile electronic device 110 and the remote servers 300, however, the control circuitry 210 may perform as much processing as it is capable of performing. Accordingly, the mobile software applications executed by the control circuitry 210 may be smaller, simpler versions of corresponding software applications that may be executed in a full mobile operating system environment.

The storage devices 214 may include random access memory (e.g., dynamic random access memory (DRAM), static random access memory (SRAM), etc.), read only memory (e.g., electrically programmable read only memory (EPROM), Flash memory, etc.), on-board storage (e.g., flash storage, etc.), portable media readers (e.g., portable secure digital (SD) card readers, or other memory cards known in the art), other memory storage devices, and combinations thereof. In some embodiments, the storage devices 214 may be configured to permanently store the computer-readable instructions. In some embodiments, the storage devices 214 may be configured to temporarily store the computer-readable instructions. By way of non-limiting example, the computer-readable instructions may be stored on a non-volatile data storage device of the memory storage devices 214, and transferred to a volatile memory device of the storage devices 214 for execution by the processors 212. Also, data (e.g., audio input data 222, biometric data 232, etc.) may be stored by the storage devices 214 during processing thereof, and otherwise.

The processors 212 may include a microcontroller, a central processing unit (CPU), a programmable logic controller, (PLC), other processing circuits, and combinations thereof. The processors 212 may be configured to execute the computer-readable instructions stored in the storage devices 214. Accordingly, the computer-readable instructions transform the processors 212 and the storage devices 214 from a general-purpose computer into a special-purpose computer configured to carry out embodiments of the disclosure.

The wearable mobile electronic device 200 may include one or more input devices 290 (hereinafter "input devices" 290) configured to receive user inputs from the user. The input devices 290 may be configured to enable the user to provide user inputs to control basic functions (e.g., skip an audio track, receive a subsequent audio input through the audio transducer 220, etc.) of the wearable mobile electronic device 200. By way of non-limiting example, the input devices 290 may include a motion sensor configured to detect a wave of a hand next to the wearable mobile electronic device 200. Also by way of non-limiting example, the input devices 290 may include an accelerometer (e.g., could also be one of the biometric sensors 230) configured to detect certain gestures (a rapid shake, a tilt at a particular angle, etc.). As a further non-limiting example, the input devices 290 may include one or more buttons on the wearable mobile electronic device 290. As yet another non-limiting example, the input device 290 may include the above-described one or more audio transducers 220 (e.g., a microphone) configured to convert acoustic energy to audio input data 222 and enable voice commands, queries, and other voice inputs to control, operate, and otherwise use the wearable mobile electronic device 200. In instances where the wearable mobile electronic device 200 is a headphone device, however, it may be preferable to not have buttons that require a press to activate, as pressing buttons may dislodge the headphone device from ideal placement on or in the ear. As one specific, nonlimiting example, the wearable mobile electronic device 200 may include the above-described one or more audio transducers 220 (e.g., a microphone) in an always-on operational state, such that audio inputs are continuously received by the transducer 220 and the wearable mobile electronic device 200 processes the audio inputs to determine whether any of them constitute voice inputs to change the operational state of the wearable mobile electronic device 200. As another specific, nonlimiting example, the wearable mobile electronic device 200 may include the above-described one or more audio transducers 220 (e.g., a microphone) in a selectively triggerable operational state, such that audio inputs received by the transducer 220 are processed by the wearable mobile electronic device 200 to determine whether any of them constitute voice inputs to change the operational state of the wearable mobile electronic device 200 when a triggering event occurs (e.g., when a button is pressed or held, when a threshold minimum decibel level is exceeded, when a hand wave is registered).

In some embodiments, the wearable mobile electronic device 200 may also include an electronic display 280. The electronic display 280 may be a relatively small display configured to provide a graphical user interface, display date and time, provide audio track information, facilitate interaction with the software media player, provide a stopwatch function, display social media status and information, display biometric data, provide other functions, and combinations thereof. In some embodiments, the electronic display 280 may include a touch screen display configured to receive inputs from the user. As previously discussed, however, in some embodiments, the wearable mobile electronic device 200 may not include any electronic display 280.

Figure 3:
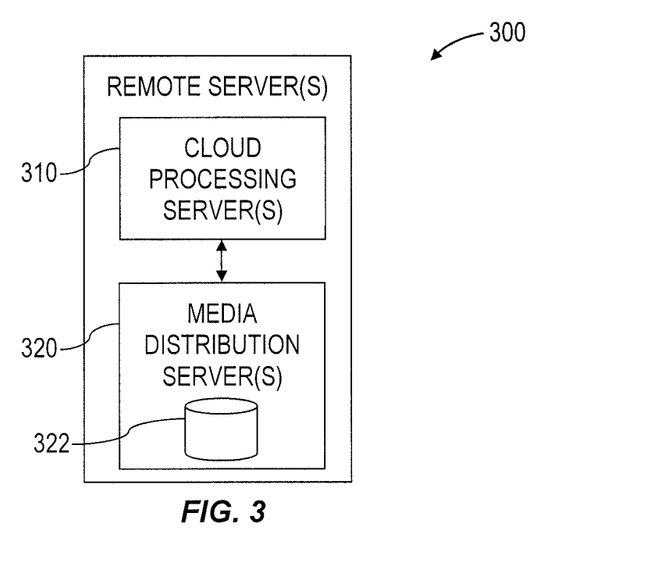
FIG. 3 is a simplified block diagram of one or more remote servers of the electrical system of FIG. 1.

FIG. 3 is a simplified block diagram of the remote servers 300 of the electrical system 100 of FIG. 1. The remote servers 300 may include one or more cloud processing servers 310 (hereinafter "cloud processing servers" 310) and one or more media distribution servers 320 (hereinafter "media distribution servers" 320). The cloud processing servers 310 may be configured to provide cloud processing for the wearable mobile electronic device 200 (FIGS. 1 and 2). By way of non-limiting example, the cloud processing servers 310 may be configured to provide processing including speech recognition processing, audible output generation procession, biometric data 232 (FIG. 2) processing, social media processing, full mobile operating system processing to support smart mobile electronic device features for the wearable mobile electronic device 200, and combinations thereof.

The media distribution servers 320 may be configured to provide digital media (e.g., audio media) to the wearable mobile electronic device 200 (FIGS. 1 and 2). By way of non-limiting example, the media distribution servers 320 may be configured to automatically select and distribute digital media to the wearable mobile electronic device 200. The media distribution servers 320 may include a database 322 of media content for distributing to the wearable mobile electronic device 200. The database 322 may be stored on one or more data storage devices 414 (FIG. 4) of the remote servers 300.

Figure 4:
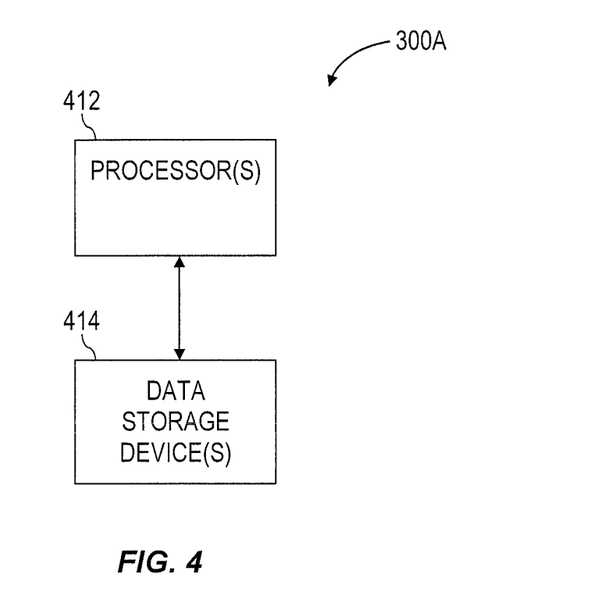
FIG. 4 is a simplified block diagram of example remote servers of the remote servers of FIGS. 1 and 3.

FIG. 4 is a simplified block diagram of example remote servers 300A (hereinafter "remote servers 300A) of the remote servers 300 of FIGS. 1 and 3. The remote servers 300A may include one or more processors 412 (hereinafter "processors" 412) operably coupled to one or more data storage devices 414 (hereinafter "storage devices" 414). The storage devices 414 may be configured to store computer-readable instructions configured to instruct the processors 412 to perform at least a portion of the functions the remote servers 300 (FIGS. 1 and 3), 300A are configured to perform. By way of non-limiting example, the computer-readable instructions may be configured to instruct the processors 412 to perform the functions of the cloud processing servers 310 (FIG. 3), the media distribution servers 320 (FIG. 3), and combinations thereof.

The storage devices 414 may include random access memory (e.g., dynamic random access memory (DRAM), static random access memory (SRAM), etc.), read only memory (e.g., electrically programmable read only memory (EPROM), Flash memory, etc.), portable media readers (e.g., compact disc (CD) readers, digital versatile disc (DVD) readers, portable secure digital (SD) card readers, compact flash card readers, etc.), hard disk drives, other memory and storage devices, and combinations thereof. In some embodiments, the storage devices 414 may be configured to permanently store the computer-readable instructions. In some embodiments, the storage devices 414 may be configured to temporarily store the computer-readable instructions. By way of non-limiting example, the computer-readable instructions may be stored on a non-volatile data storage device of the memory storage devices 414, and transferred to a volatile memory device of the storage devices 414 for execution by the processors 412.

The processors 412 may include a microcontroller, a central processing unit (CPU), a programmable logic controller (PLC), other processing circuits, and combinations thereof. The processors 412 may be configured to execute the computer-readable instructions stored in the storage devices 414. Accordingly, the computer-readable instructions transform the processors 412 and the storage devices 414 from general-purpose computers into a special-purpose computers configured to carry out embodiments of the disclosure.

Although each of the exemplary operations illustrated in the drawings and accompanying text recites steps performed in a particular order, the present invention does not necessarily need to operate in that recited order. One of ordinary skill in the art would recognize many variations, including performing steps in a different order.

While certain illustrative embodiments have been described in connection with the figures, one of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors. Thus, the scope of the invention is only limited by the literal language, and legal equivalents, of the claims that follow.

What is claimed is:

1. An electrical system, comprising:
    a wearable mobile electronic device including:
        cellular voice equipment configured to enable a user of the wearable mobile electronic device to participate in cellular voice calls through a cellular voice network;
        cellular data equipment configured to enable the wearable mobile electronic device to communicate through a cellular data network;
        one or more biometric sensors;
        at least one audio speaker;
        control circuitry operably coupled to the cellular voice equipment, the cellular data equipment, the one or more biometric sensors, and the at least one audio speaker, the control circuitry including a processor operably coupled to a data storage device comprising computer-readable instructions stored thereon, the processor configured to execute the computer-readable instructions, wherein the computer-readable instructions are configured to instruct the processor to:
            engage in communications with a remote server using the cellular data equipment; and
            interact with the remote server to provide audio signals to the at least one audio speaker, the audio signals corresponding to audio media selected based, at least in part, on biometric data provided to the control circuitry by the one or more biometric sensors,
        wherein the selected audio media has a beat that is faster than a rate of running steps measured by the biometric sensors when a heart rate measurement by the biometric sensors is slower than a desired heart rate; and the selected audio media has a beat that is slower than the rate of running steps measurement by the biometric sensors when the heart rate measurement by the biometric sensors is faster than a desired heart rate.

2. The electrical system of claim 1, wherein the wearable mobile electronic device is configured to receive audio data corresponding to the audio signals from the remote server, and present the audio media to the user as streamed audio.

3. The electrical system of claim 1, wherein the wearable mobile electronic device is configured to provide the biometric data to the remote server for processing by the remote server.

4. The electrical system of claim 1, wherein the one or more biometric sensors include at least one sensor selected from the group consisting of an accelerometer, a temperature sensor, a location sensor, a heart rate monitor, and a pulse oxygenation sensor.

5. The electrical system of claim 1, wherein the wearable mobile electronic device includes a headphone device including the cellular voice equipment, the cellular data equipment, the one or more biometric sensors, the at least one audio speaker, and the control circuitry.

6. The electrical system of claim 1, wherein the wearable mobile electronic device includes an input device including a motion sensor configured to sense a wave of a hand near the wearable mobile electronic device.

7. A method of operating the electrical system of claim 1, the method comprising:
    detecting biometric information of a user of the wearable mobile electronic device with the one or more biometric sensors of the wearable mobile electronic device;
    selecting audio media based, at least in part, on the biometric information by:
        selecting audio media with a beat that is faster than a measured rate of running steps of the user when a measured heart rate of the user is slower than a desired heart rate; and
        selecting audio media with a beat that is slower than the measured rate of running steps of the user when the measured heart rate of the user is faster than a desired heart rate;
    providing, with the remote server, data corresponding to the selected audio media to the wearable mobile electronic device through the cellular data network; and
    placing and receiving cellular voice calls natively with the wearable mobile electronic device through the cellular voice network.

8. The method of claim 7, further comprising processing the detected biometric information with the remote server to determine at least one of a rate of steps of a user of the wearable mobile electronic device and a heart rate of the user.

9. The method of claim 7, further comprising determining frequencies of beats of music files of the audio media using at least one of metadata indicating the frequencies of beats embedded into the music files and frequency analysis of the music files.

* * * * *